US006942131B2

(12) United States Patent
Trautman et al.

(10) Patent No.: US 6,942,131 B2
(45) Date of Patent: Sep. 13, 2005

(54) BEVERAGE HOLDER FOR A MOTORCYCLE HANDLEBAR OR THE LIKE

(76) Inventors: Tim Trautman, 30054 Hwy. 278 West, Nettleton, MS (US) 38858; Roger Goodwin, 22460 Hwy. 45 North, Aberdeen, MS (US) 39730

( * ) Notice: Subject to any disclaimer, the term of this patent is extended or adjusted under 35 U.S.C. 154(b) by 136 days.

(21) Appl. No.: 10/308,515

(22) Filed: Dec. 3, 2002

(65) Prior Publication Data

US 2004/0104255 A1 Jun. 3, 2004

(51) Int. Cl.[7] ........................ B62J 11/00

(52) U.S. Cl. ........................ 224/414; 224/420; 224/431; 224/448; 224/547; 224/926; 248/311.2

(58) Field of Search ........................ 224/274, 413, 224/414, 420, 425, 427, 431, 448, 547, 926; 280/288.4; 220/737, 739; 248/311.2

(56) References Cited

U.S. PATENT DOCUMENTS 1,751,463 A * 3/1930 Backus et al. .............. 224/547
3,844,459 A * 10/1974 Chambers .............. 224/274
4,596,370 A * 6/1986 Adkins .............. 224/414
4,697,780 A * 10/1987 Wenkman et al. .............. 248/311.2
4,878,642 A * 11/1989 Kirby, Jr. .............. 248/311.2
5,007,612 A * 4/1991 Manfre .............. 248/311.2
5,356,107 A * 10/1994 Sinohuiz .............. 248/311.2
5,813,646 A * 9/1998 Bartholomae .............. 248/311.2
5,823,496 A * 10/1998 Foley et al. .............. 248/311.2
6,390,427 B1 * 5/2002 McConnell et al. .............. 248/311.2
6,505,802 B2 * 1/2003 Fowler .............. 248/311.2
6,575,417 B1 * 6/2003 Krommenakker .............. 248/311.2
6,601,813 B1 * 8/2003 Kager et al. .............. 248/311.2

FOREIGN PATENT DOCUMENTS

FR 2612064 * 9/1988 .............. 248/311.2

* cited by examiner

*Primary Examiner*—Gary E. Elkins
(74) *Attorney, Agent, or Firm*—Jackson Walker L.L.P.; Mark A. Tidwell, Esq.

(57) ABSTRACT

An aftermarket beverage holder for commercial beverage cans is adapted for mounting on the handlebars of a motorcycle or bicycle. A mounting bracket is adapted to be clamped on the handlebars. An open topped cylindrical can or container is mounted on the mounting bracket. The container is adapted for receiving a commercial beverage container such as a soda can. The container may be selectively mounted on or removed from the mounting bracket. An insulating liner is slightly larger than the beverage can for hugging the can and assuring that the can does not inadvertently become dislodged from the beverage holder. The system is designed such that the container can be selectively mounted on and removed from the mounting system without removing the beverage can from the container.

19 Claims, 3 Drawing Sheets

BEVERAGE HOLDER FOR A MOTORCYCLE HANDLEBAR OR THE LIKE

BACKGROUND OF THE INVENTION

1. Field of the Invention

The subject invention is generally related to beverage holders for vehicles and is specifically directed to a beverage holder adapted to be mounted on handlebars or the like, such as the handlebars of a motorcycle.

2. Discussion of the Prior Art

Beverage holders are well known. In recent years they have become standard equipment on many vehicles, particularly cars and trucks. Many are mounted in the vehicle as part of the original equipment of the vehicle. Others are sold as aftermarket accessories. Most, but not all, of the aftermarket beverage holders include a mounting system for fixedly, if not permanently, mounting the holder on the vehicle.

Many are lined with an insulating material to assist in maintaining the cold temperature of the beverage. In some cases the liner is removable for cleaning purposes.

SUMMARY OF THE INVENTION

The subject invention is directed to an aftermarket beverage holder particularly well suited for mounting on the handlebars of a motorcycle or bicycle. Specifically, the preferred embodiment of the invention includes a mounting bracket adapted to be clamped on the handlebars. An open topped cylindrical can or container is mounted on the mounting bracket. The container is adapted for receiving a commercial beverage container such as a soda can.

In the preferred embodiment, the beverage holder of the subject invention includes a container that may be selectively mounted on or removed from the mounting bracket. Also in the preferred embodiment of the invention, the container includes an insulating liner such as, by way of example, a resilient foam liner. The liner is slightly larger than the beverage can for hugging the can and assuring that the can does not inadvertently become dislodged from the beverage holder. The system is designed such that the container can be selectively mounted on and removed from the mounting system without removing the beverage can from the container.

A detailed description of the invention follows.

DETAILED DESCRIPTION OF THE PREFERRED EMBODIMENTS

Figure 1:
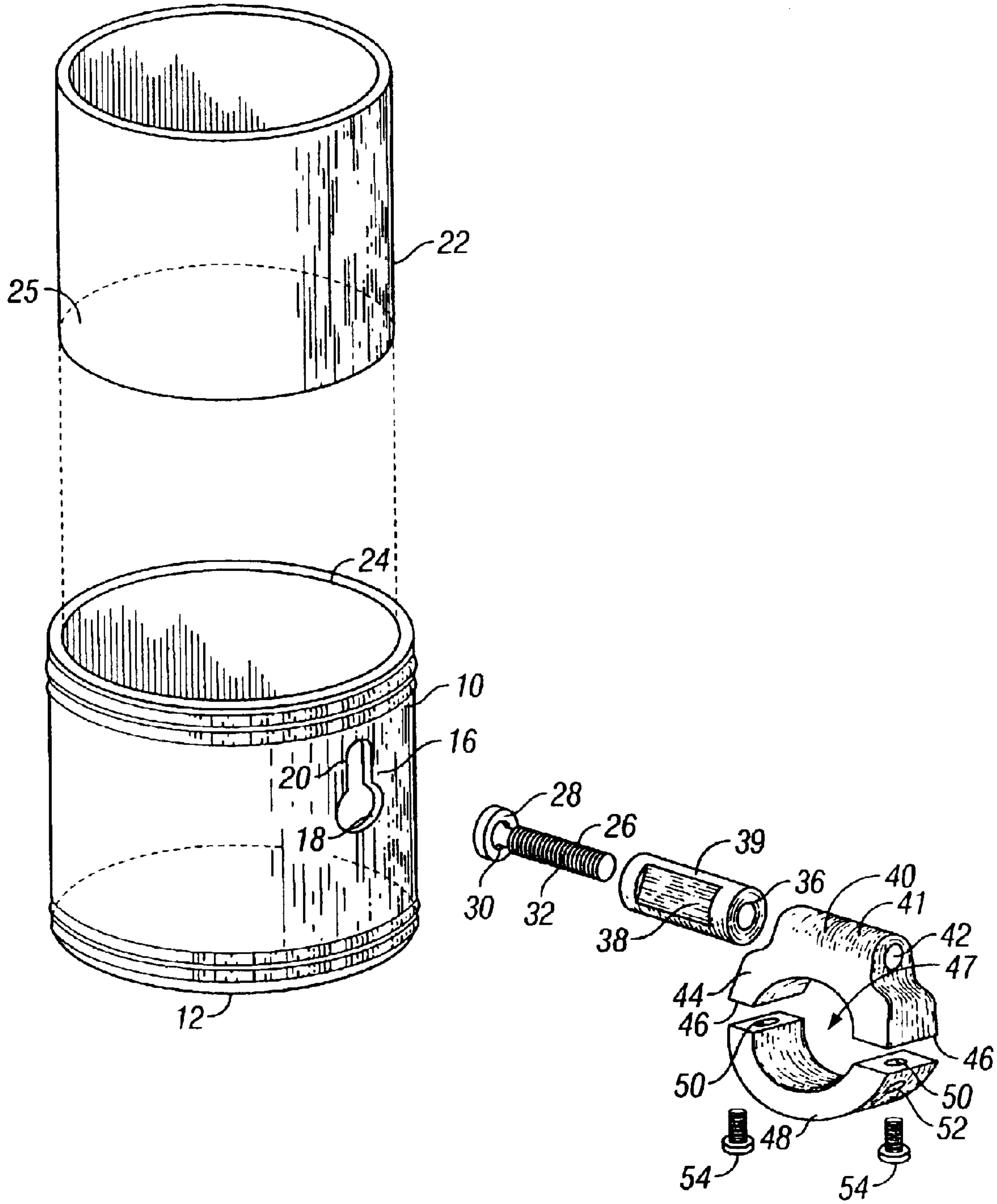
FIG. 1 is an exploded view showing the components of the beverage holder assembly.
Figure 2:
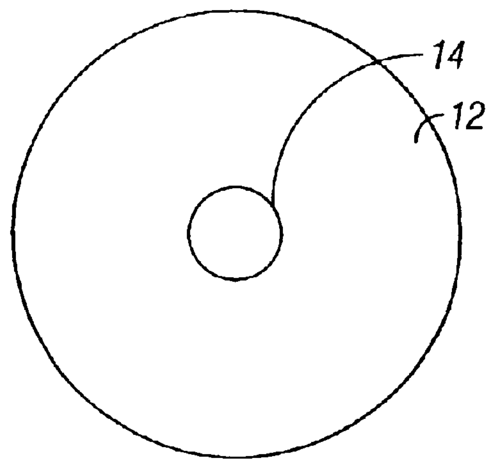
FIG. 2 is a bottom view of the container portion of FIG. 1.

The mountable beverage holder of the subject invention is shown in an exploded view in FIG. 1. The container base is an open topped cylindrical can 10 having a closed bottom 12 and an open mouth. A drain hole 14 is provided in the closed bottom. The side wall of the can includes a keyhole slot 16 having a wide access opening 18 and a securing slot 20. An open topped foam insulating cylinder 22 is adapted to be received in the can 10. The insulating cylinder may have a closed bottom or an open bottom 25, as shown.

The mounting system acts as a coupler for coupling or mounting the can 10 to the mounting system. The mounting system includes a bolt 26 having an enlarged head 28 and a reduced support channel 30. The head 28 is sized to be received in the enlarged access opening 18 of the slot 16, with the support channel 30 sized to be received in the securing slot 20 of the slot 16. In the preferred embodiment, the support channel 30 is slightly smaller than the securing slot 20, permitting the can 10 to rotate freely relative to the mounting system.

The mounting system also includes a spacer 34 having a clearance bore 26 for receiving the threaded shank 32 of the mounting bolt 26. The spacer may include a flat surface or area 38, preferably on opposite sides of the spacer, for facilitating grasping the assembled mounting system between the thumb and forefinger.

The mounting bracket 40 includes an upper member 41 having a threaded bore 42 for receiving the threaded shank 32 of the mounting bolt 26. The bolt 26, spacer 28 and bracket 40 are held in assembled relationship by placing the bolt through the bore 36 in the spacer and securing it in the mated threaded bore 42 in the bracket 40. The lower portion 44 of the bracket is formed into an arcuate surface adapted for mating with a tubular member such as a handlebar or the like. The lower member 48 of the mounting bracket includes a complementary arcuate surface. The ends 46 of the upper member 41 and the opposing ends 50 of the lower member 48 are designed to be placed in alignment with one another when the assembly is assembled to provide a clearance hole for mounting the assembly on handlebars or the like. Mounting screws 54 are received in the clearance holes 52 provided in the lower member 48 and are secured in receptive tapped holes (not shown) in the upper member 41 for securing the assembled system onto handlebars or the like.

Figure 3:
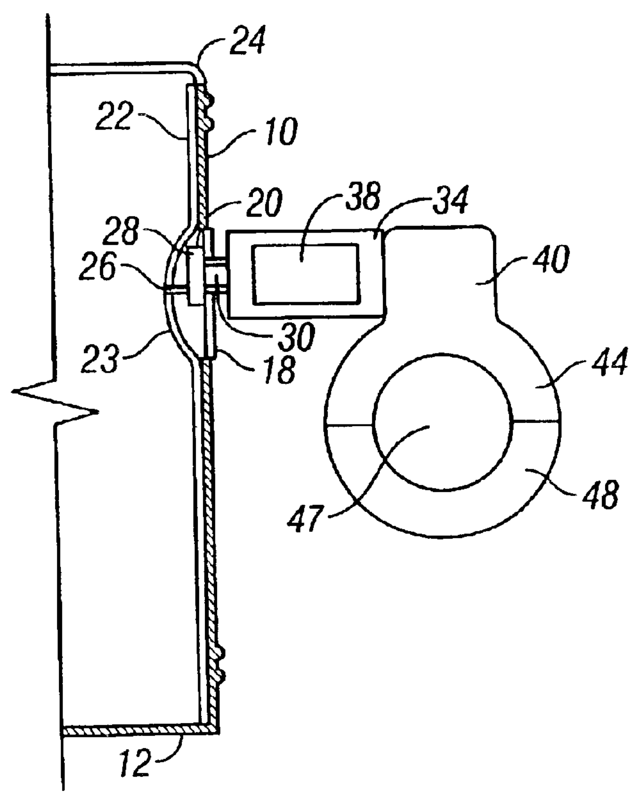
FIG. 3 is a longitudinal, partial cross-section of the assembly, showing the components in assembled relationship.
Figure 4:
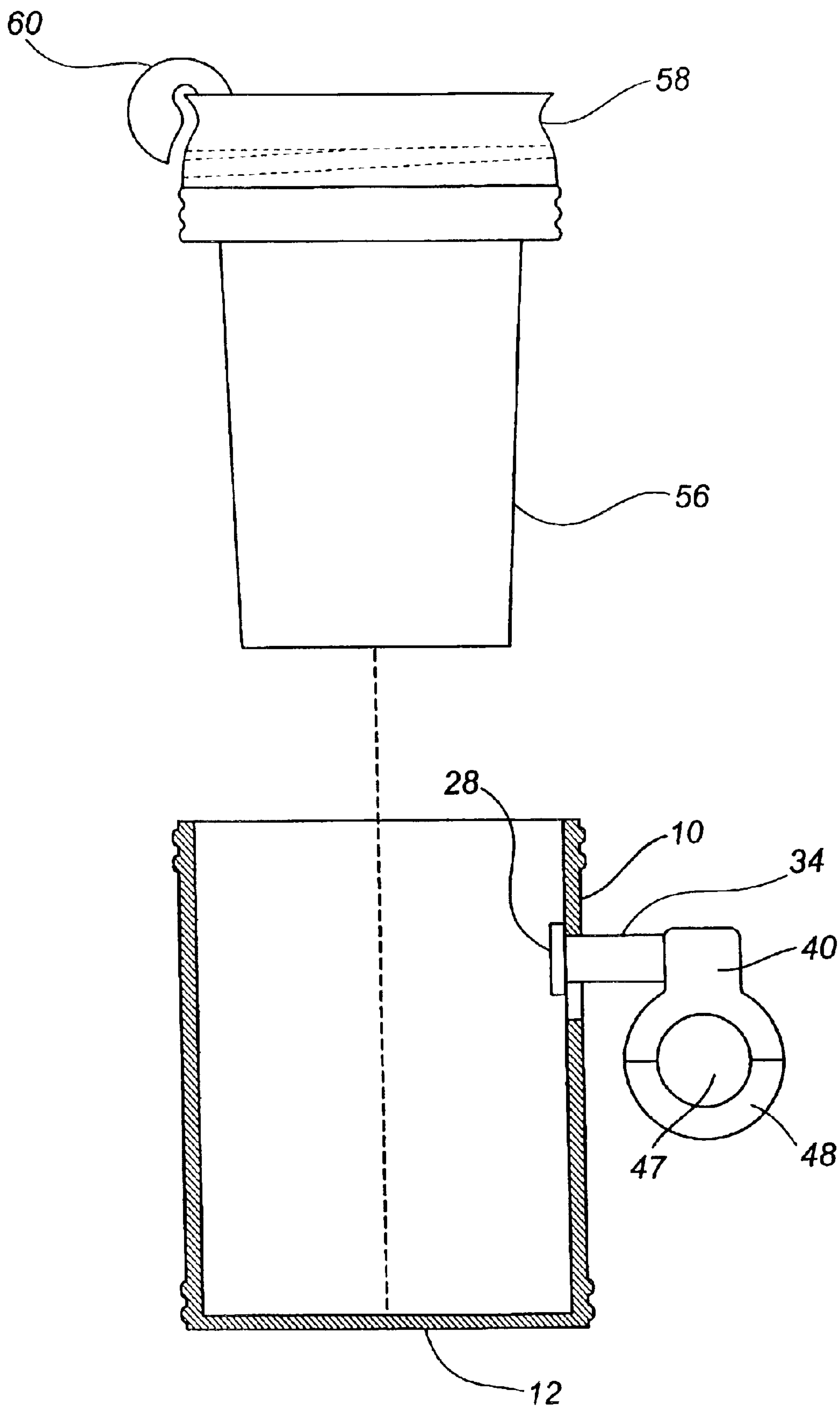
FIG. 4 is a side view of the beverage holder assembly utilized in combination with a beverage can.

When fully assembled, and as better shown in FIG. 3, the head 28 of the mounting bolt 26 is seated in the securing slot 20 of the slot 16 in the can 10. The head protrudes through the can and slightly displaces the foam insulating cylinder 22, as shown at 23. The upper lip 24 of the can 10 may be rounded inward to secure the foam cylinder 22 in place when assembled. This facilitates insertion and removal of a beverage container such as a soda can or water bottle without disturbing the assembled relationship of the insulating cylinder in the can.

In the preferred embodiment, the foam cylinder is of an inside diameter slightly smaller than a typical beverage can, thereby "hugging" the can and assuring the can does not inadvertently dislodge from the container.

In one embodiment, the beverage holder of the subject invention is sized to receive a coffee cup 66 or the like having a releasably attachable lid portion 58. In one embodiment, the lid portion 58 is equipped with a plurality of threads 62 and a handle shaped to define a grasping portion 60.

One of the significant advantages of the beverage holder of the subject invention is that the can container 10 may be mounted on and removed from the mounting assembly without removing the system from the handlebar or other support element. This permits the beverage to stay in the insulated can carrier whether or not the user is near the mounting system. The pivotal mount system permitting the can 10 to pivot relative to the bolt 36 minimizes the mounting effort and also permits the can to be self righting, thereby minimizing spills.

While certain embodiments and features of the invention have been described in detail herein, it will be understood that the invention includes all modifications and enhancements within the scope and spirit of the following claims.

What is claimed is:

1. A beverage holder comprising:

a. a container having an inner wall adapted for holding a commercial beverage container and an outside wall;

b. an insulating layer substantially coexistent with the inner wall;

c. a mounting assembly for mounting the beverage holder to said handlebar, said mounting assembly comprising:

d. a coupler for removably coupling the container to the mounting assembly, whereby the container may be selectively mounted on and removed from the mounting assembly without removing the commercial beverage container from the container; and e. wherein said container is pivotally attached to said mounting assembly to permit a rocking action between said container and the handlebar.

2. The beverage holder of claim 1, wherein the insulating layer is a foam cylinder adapted to be inserted in the container.

3. The beverage holder of claim 1, wherein the mounting assembly includes a bracket for securing the assembly to the handlebar.

4. The beverage holder of claim 1, the container including a bottom.

5. The beverage holder of claim 4, wherein the bottom includes a drain hole.

6. The beverage holder of claim 1, wherein the coupler includes a mounting member, having an enlarged head and a through slot, located on a side wall of the container, adapted for receiving the enlarged head.

7. The beverage holder of claim 6, the slot comprising a keyhole slot having a wide portion and a narrow portion, whereby the enlarged head may pass through the large portion but cannot pass through the narrow portion.

8. The beverage holder of claim 4, wherein the bottom is closed.

9. A beverage holder comprising:

a. a container having an inner wall adapted for holding a commercial beverage container, an outside wall, and an inwardly facing lip;

b. an insulating layer substantially coexistent with the inner wall, whereby the inwardly facing lip secures the insulating layer to the container;

c. a mounting assembly for mounting the beverage holder to a support;

d. a coupler for removably coupling the container to the mounting assembly, whereby the container may be selectively mounted on and removed from the mounting assembly without removing the commercial beverage container from the container.

10. A beverage holder comprising:

a. a container having an inner wall adapted for holding a commercial beverage container and an outside wall;

b. an insulating layer substantially coexistent with the inner wall;

c. a mounting assembly for mounting the beverage holder to a support;

d. a coupler for removably coupling the container to the mounting assembly, which includes a mounting member, located on the mounting assembly, having an enlarged head and a through slot, located on a side wall of the container, adapted for receiving the enlarged head, whereby the container may be selectively mounted on and removed from the mounting assembly without removing the commercial beverage container from the container, and whereby there exists sufficient clearance between the enlarged head and the through slot to permit a rocking action between the container and the mounting assembly.

11. A beverage holder adapted to be mounted on a handlebar, the beverage holder comprising:

a. a cylindrical open topped container having an open mouth sufficient to receive a commercial beverage container;

b. an insulating layer between the container and the commercial beverage container;

c. a mounting assembly including a bracket having an upper member and a lower member, wherein the upper member mates with the lower member to provide a clearance hole for attaching the container to a support in a circumferential manner, the mounting assembly adapted for removably supporting the container whereby the container may be selectively mounted on and removed from the mounting assembly without removing the commercial beverage container from the container, wherein the container is pivotally attached to the mounting assembly to permit a rocking action between the container and the handlebar.

12. The beverage holder of claim 11, wherein the insulating layer is a foam cylinder adapted to be inserted in the container.

13. The beverage holder of claim 11, the container including a bottom.

14. The beverage holder of claim 13, wherein the bottom includes a drain hole.

15. The beverage holder of claim 11, the mounting assembly including a mounting member having an enlarged head and the container having a side wall with a through slot adapted for receiving the enlarged head.

16. The beverage holder of claim 15, the slot comprising a keyhole slot having a wide portion and a narrow portion, whereby the enlarged head may pass through the large portion but cannot pass through the narrow portion.

17. The beverage holder of claim 13, wherein the bottom is closed.

18. A beverage holder adapted to be mounted on a handlebar, the beverage holder comprising:

a. a cylindrical open topped container having an open mouth sufficient to receive a commercial beverage container and an inwardly facing lip;

b. an insulating layer between the container and the commercial beverage container, whereby the inwardly facing lip secures the insulating layer to the container;

c. a mounting assembly for mounting the container on a handlebar, the mounting assembly adapted for removably supporting the container whereby the container may be selectively mounted on and removed from the mounting assembly without removing the commercial beverage container from the container.

19. A beverage holder adapted to be mounted on a handlebar, the beverage holder comprising:

a. a cylindrical open topped container having an open mouth sufficient to receive a commercial beverage container and a side wall with a through slot;

b. an insulating layer between the container and the commercial beverage container;

c. a mounting assembly for mounting the container on a handlebar which includes a mounting member having an enlarged head for engaging the through slot, the mounting assembly adapted for removably supporting the container, whereby the container may be selectively mounted on and removed from the mounting assembly without removing the commercial beverage container from the container, and whereby there exists sufficient clearance between the enlarged head and the through slot to permit a rocking action between the container and the mounting assembly.

* * * * *